Patented May 1, 1928.

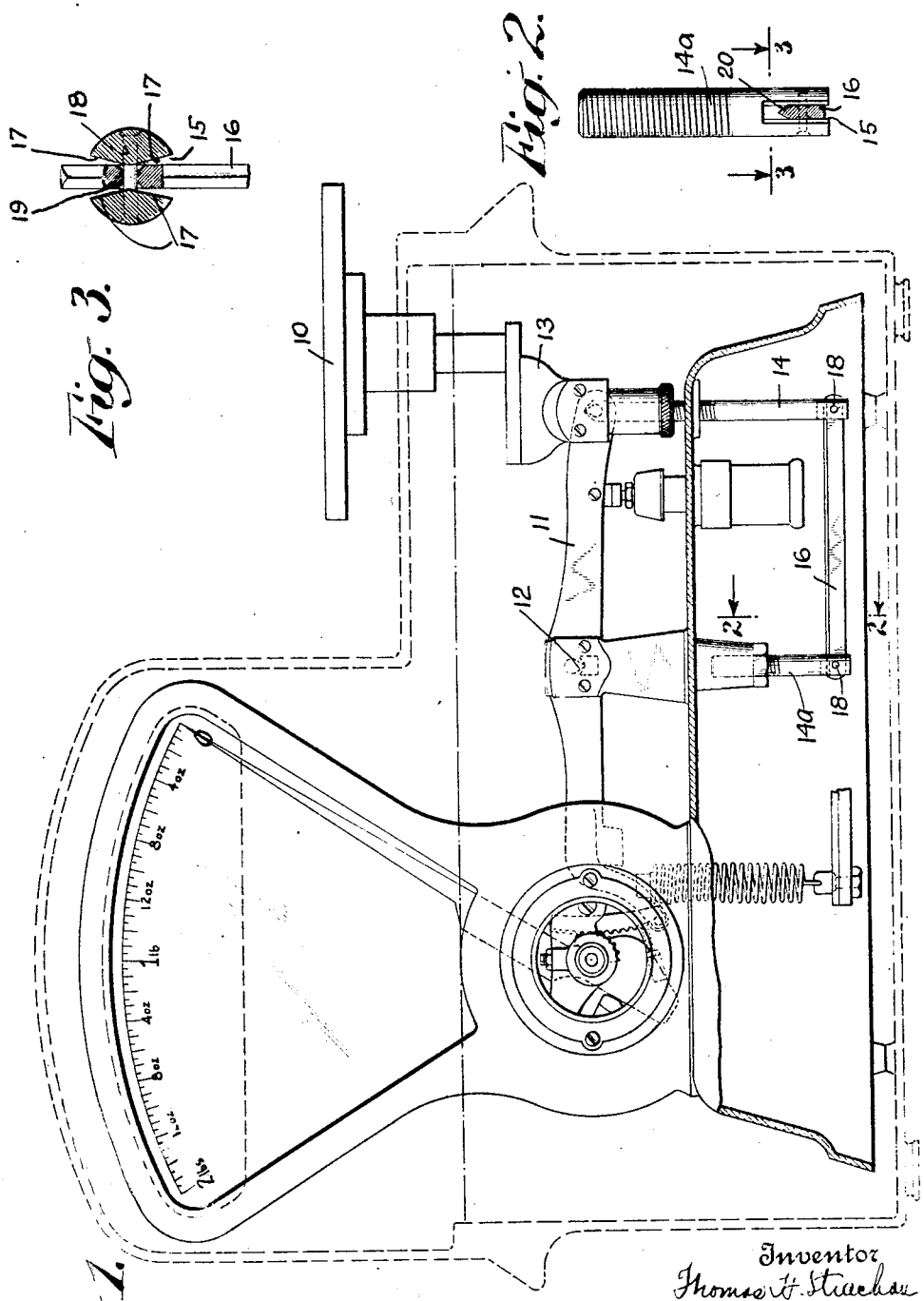

1,668,029

UNITED STATES PATENT OFFICE.

THOMAS H. STRACHAN, OF DAYTON, OHIO, ASSIGNOR TO DAYTON SCALE COMPANY, OF DAYTON, OHIO, A CORPORATION OF NEW JERSEY.

CHECK FOR WEIGHING SCALES.

Application filed June 3, 1925. Serial No. 34,532.

This invention relates to improvements in checks for weighing scales and has for its object the provision of a check which will operate with a minimum of friction while serving the usual function of a check for maintaining the platform of the scale in horizontal position.

A further object of the present invention resides in the provision of a check which is particularly adapted for use in scales of the type which are immersed in an oil bath to protect the weighing parts against the action of a corrosive or other agents. In such scales it has been found that the check itself acts as a damping device and according to the present invention provision is made for shaping the checks so that it does not afford excessive resistance to movement through the oil which surrounds the check.

In the drawings,

Fig. 1 shows a scale equipped with my improved check.

Fig. 2 is a detail view taken substantially on line 2—2 of Fig. 1.

Fig. 3 is a detail sectional view taken substantially on line 3—3 of Fig. 2.

In more detail in the drawings the scale is of conventional form including a platform 10 supported in the usual way upon a lever 11 fulcrumed at 12. Depending downwardly from the platform holder 13 there is a post 14. A smaller post 14ª also depends downwardly from the frame of the scale at a point below the fulcrum 12. These threaded posts 14ª and 14 are notched at the bottom as shown at 15 (Figs. 2 and 3) to receive a transversely extending check link 16. In order to provide for slight lateral side movement of the check link 16 the posts are provided with beveled surfaces best shown at 17 in Fig. 3. Passing through the check link 16 and the posts 14ª and 14 are pivot pins 18. Preferably the check is slightly countersunk to provide a slight clearance as shown at 19 in Fig. 3. By providing the check posts 14 with the beveled surfaces 17 and by providing pin 18 with clearance therearound at 19 a check construction is secured which while affording comparatively free movement of the parts still secures accurate check action.

To facilitate the movement of the check through the oil in which the check parts are submerged I preferably bevel the upper surface of the check as shown at 20 in Fig. 2. The lower surface also could be beveled, if desired, but in practice it has been found that one bevel is sufficient. By the provision of a bevel 20 the check is permitted to move in an upward direction without setting up excessive surges of the oil which covers the check parts.

What I claim is:—

1. A check for a weighing scale comprising a check link, a pair of posts carrying pins to pivotally support the check link, said posts being notched to receive the said link, said notched portion of the said posts being provided with double beveled surfaces to permit lateral rocking of the said check link.

2. A check construction for a weighing scale comprising a fixed post depending from the frame of the scale, and a movable post attached to the platform holder of the scale, said posts being provided with vertically extending notches at their lower ends to receive a check link the opposite sides of said notches being provided with oppositely beveled surfaces which at their junction provide vertically extending pivot-like bearings for the sides of the check link, and a check pivotally carried by said posts and bearing against said beveled surfaces in the notches therein.

3. A check construction for a weighing scale comprising a pair of supporting posts notched to receive a check link, a pin carried by each post and bridging the notched portion thereof, a check link provided with drilled openings to receive said pins and also provided with countersunk clearance portions to permit a slight lateral movement of the check link relatively to its pivot pins, said posts being provided with beveled surfaces joining to provide a vertical pivot-like bearing at each side of the check link.

4. A check link adapted for use in a weighing scale having parts thereof submerged in an oil bath, said check link having a beveled and sharpened upper surface to facilitate the movement of the check link through the oil in which the check is immersed.

5. A check link for weighing scales provided with a bearing perforation therein, said perforation comprising oppositely extending bevelled bearing surfaces to provide for slight play between the link and its support.

6. A check link for a weighing scale comprising a surface bevelled in the direction of motion thereof to reduce the friction of the fluid in which the link operates thereon.

7. A check link for a weighing scale comprising a face consisting of two meeting bevelled surfaces forming a wedge-like portion having its edge extending in an operating direction of motion of said link.

8. A check construction for a weighing scale comprising a fixed post depending from the frame of the scale and a movable post attached to the platform holder of the scale, said posts being provided with vertically extending notches at their lower ends, said notches comprising oppositely disposed horizontally bevelled surfaces, and a check link mounted in said notches on pins extending therethrough said link having pin receiving perforations countersunk at their outer ends and said link having a wedge shaped configuration in a direction of its operating motion.

In testimony whereof I hereto affix my signature.

THOMAS H. STRACHAN.